May 29, 1962   J. W. NORWOOD   3,036,873
PISTON AND PISTON ROD CONNECTION
Filed Sept. 13, 1961

INVENTOR.
JOHN W. NORWOOD

BY Kimmel & Crowell
ATTORNEYS 3,036,873
PISTON AND PISTON ROD CONNECTION
John W. Norwood, Cottage Grove, Oreg., assignor to Kimwood Machine Co., Cottage Grove, Oreg.
Filed Sept. 13, 1961, Ser. No. 137,760
5 Claims. (Cl. 309—17)

This invention relates to a piston and piston rod connection, and has as its primary object the provision of a substantially shockproof unbreakable connection of this character.

A more specific object of the invention is the provision of a piston mounting particularly adapted to air cylinders in extreme high cycle cylinder action where stresses and impacts are critical.

A further object of the invention is the provision in a connection of this character of neoprene washers or similar washers of rubber like compounds of proper resilience at each end of the connection, the yielding qualities of these washers substantially eliminating rod breakage and the loosening of pistons by impact or temperature conditions.

An additional object of the invention is the provision of a connection of this character which is highly durable and sturdy in construction, which is reliable and efficient in operation, and which is relatively simple and inexpensive to manufacture, assemble, and utilize.

Figure 1:
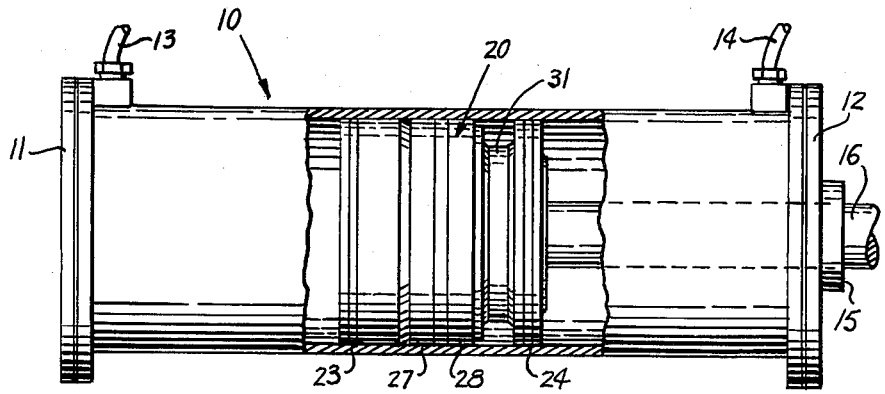
Figure 2:
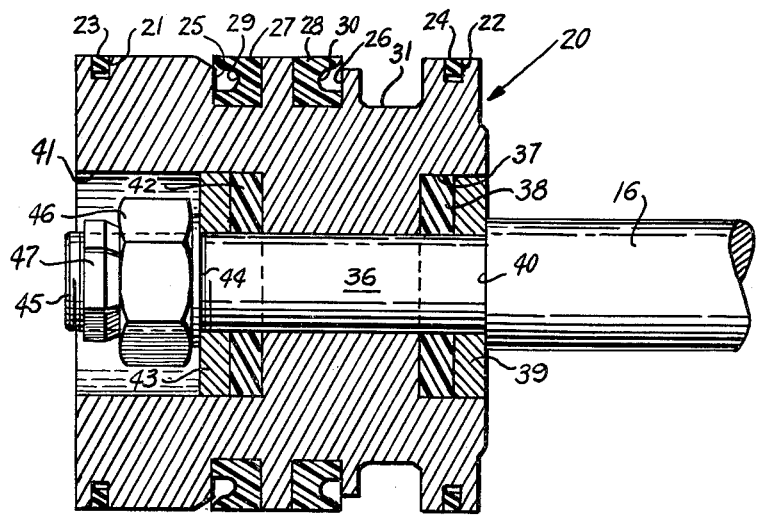

Still other objects reside in the combinations of elements, arrangements of parts, and features of construction, all as will be more fully pointed out hereinafter and disclosed in the accompanying drawings wherein:

FIGURE 1 is a side elevational view, partially broken away, of an air cylinder showing the piston of the instant invention positioned therein; and FIGURE 2 is an enlarged vertical sectional view taken substantially along the center line of the piston and piston rod showing the connection of the instant invention.

Similar reference characters refer to similar parts throughout several views of the drawing.

Having reference now to the drawings in detail, there is generally indicated at 10 an air cylinder, which is provided at each end with headers 11 and 12, respectively, and air inlets 13 and 14, respectively. The header 12 is provided with a bushing 15, containing an opening through which the piston rod 16 is passed in the usual manner. The piston of the instant invention is generally indicated at 20 and includes a body 21 of metal or other suitable material, which is provided about its outer periphery with a plurality of grooves 21 and 22 adjacent either end which contain sealing gaskets 23 and 24, respectively. At its center portion the piston is provided with two grooves 25 and 26, each of which contains an oppositely disposed sealing gasket 27 and 28 having an annular recess 29 and 30 positioned therein. An annular groove 31 is positioned adjacent one end of the piston in conventional manner.

The center of the piston is provided with a bore 35 through which extends the reduced end 36 of piston rod 16. A recess 37 is provided adjacent one end of the piston 20 and contains a resilient washer 38, and a steel washer 39, the washers being held in compressed relation by the shoulder 40 formed by the reduction of the portion 36 of piston rod 16.

The other end of the piston contains a counterbore 41 of substantially greater depth than the opening 39, on the inner face of which is seated a resilient washer 42 against which is positioned a second steel washer 43. A lock ring 44 seats against washer 43, and is held in position on the threaded end 45 of reduced portion 36 by means of a clamping nut 46 which is in turn secured in position by a lock nut 47. The lock nut 47 and nut 46 and the majority of the threaded end portions 45 are all contained within the counterbore 41, to provide a relatively smooth outer surface for the piston.

By virtue of the compressibility of the resilient washers 38 and 42, a substantially shockproof connection is provided, the yielding qualities substantially eliminating rod breakage and loosening of piston either by impact or by temperature conditions.

From the foregoing it will now be seen that there is herein provided an improved shockproof piston and piston rod connection which accomplishes all of the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative, and not in a limiting sense.

I claim:

1. In a piston and piston rod connection, the combination of a piston having a bore therethrough, a piston rod having a reduced end extending through said bore, said reduced end forming a shoulder on said piston rod, a recess at one end of said bore, a compressible washer surrounding said reduced end of said piston rod in said recess, an incompressible washer seated on said compressible washer and secured in said recess by said shoulder, a counterbore at the other end of said bore, a compressible washer surrounding said reduced end in said counterbore, an incompressible washer seating against said compressible washer, and means clamping said last-mentioned compressible and incompressible washers in said counterbore.

2. The structure of claim 1 wherein said compressible washers are comprised of neoprene.

3. The structure of claim 2 wherein said incompressible washers are comprised of steel.

4. The structure of claim 3 wherein the extremity of said reduced end of said piston rod is threaded and the means clamping the washers in said counterbore comprises a nut threaded on said extremity and a lock nut holding said first-mentioned nut in position.

5. The structure of claim 4 wherein said nut and said lock nut are wholly contained in said counterbore.

No references cited.